United States Patent Office 2,877,178
Patented Mar. 10, 1959

2,877,178

AMPHOLYTIC COMPOSITIONS IN WET TREATMENTS

Carl A. Bergman, Charlotte, N. C., and Emil C. Hansen, Glen Ridge, N. J., assignors to General Aniline & Film Corporation, New York, N. Y., a corporation of Delaware No Drawing. Application December 20, 1955
Serial No. 554,151

10 Claims. (Cl. 252—8.8)

This invention relates to improvements in the wet treatment of materials and the compositions employed in such treatments.

Many compounds and compositions have been employed in the past for the wet treatment of various types of materials, for example for cleaning, scouring, washing, softening, fulling, felting, lubricating, wetting, improving antistatic properties, and the like. In general, however, such compounds and compositions have found limited application because of their sensitivity to acids, alkalies, hard water, and the like, limited solubility and/or stability properties, and the like.

It is an object of this invention to provide an improved composition for the wet treatment of materials. Another object of this invention is the provision of improved processes for the treatment of various materials. Other objects and advantages will appear as the description proceeds.

The attainment of the above objects is made possible by the instant invention which is based upon the provision, for use in the wet treatment of materials, of a composition comprising an ampholytic compound having the formula

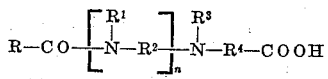

wherein R is an alkyl radical of at least 8 carbon atoms, $R^1$ and $R^3$ are selected from the group consisting of hydrogen and lower alkyl, hydroxyalkyl, hydroxyalkoxyalkyl, and hydroxypolyalkoxyalkyl, $R^2$ is an alkylene radical of from 2 to 6 carbon atoms, $R^4$ is an alkylene radical of from 1 to 4 carbon atoms, and $n$ has a value of at least 1, and about 4 to 300% based on the weight of said ampholytic compound of a non-ionic surface active compound having the formula

wherein $R^5$ is selected from the group consisting of alkylphenoxy and higher alkoxy, and $n_1$ has a value of at least 4. It has been found that the above defined compositions of this invention are stable to acids, alkalies and hard water, do not form insoluble precipitates on the material being treated, have improved properties with respect to solubility and stability in storage and constitute excellent softening, fulling, scouring, cleaning, washing, and antistatic agents and the like. They have good wetting, dispersing and detergent properties, and foam and lather well alone as a self-product or in combination with other synthetic detergents and soaps. They are not salted out of solutions containing large concentrations of electrolytes, are compatible with a wide range of other surfactants, thermosetting and thermoplastic resins, waxes, sequestering agents, and the like, and are non-corrosive to tin or terneplate and the like.

The compositions of this invention may be employed as a softener for undyed, dyed or bleached yarns to facilitate winding and knitting, as a lubricant for wool tops, for softening and "soaping" piece goods, hosiery and yarns, for softening dyeings and prints alone or in combination with a fixing step or agent such as methylol resins and copper salts, for mangle finishing purposes either alone or in combination with starches, dextrin, sulfonated tallow, oils, talc, clay and other fillers, for improving fabric smoothness, body and hand, for providing softness when applying shrinkproofing and creaseproofing effects using thermoplastic and/or thermosetting resins, for alkaline, acid and neutral fulling of wool and mixed wool fibers, as a liquid dishwashing detergent, as a rug and upholstery shampoo, as a foaming agent, as a hair shampoo, as an addition to fatty liquors in processing soft or casual type leathers, as a wetting agent in pickling and oil well treating compositions, and the like.

The ampholytic compounds employed in the compositions of this invention, and their methods of manufacture, are well known in the art and no claim is made thereto per se. In the formula for said compound given above, R may represent a saturated or unsaturated alkyl radical of at least 8 carbon atoms, $R^1$ and $R^3$ may represent hydrogen, methyl, ethyl, hydroxyethyl, hydroxyethoxyethyl, hydroxypolyethoxyethyl (containing up to 6 or more ethoxy groups), or the like, $R^2$ may represent ethylene, propylene, butylene, isopropylene, hexamethylene, or he like, $R^4$ may represent methylene, ethylene, propylene, isopropylene, butylene, or the like, and $n$ may have a value of 1 to 6. It will be understood that $R^1$ and $R^3$ may be the same or different, and that where $n$ has a value of more than 1, $R^1$ and $R^2$ may differ in the recurring amino groups. Preferred ampholytic compounds for use in the instant invention are those wherein R is an alkyl radical of 8 to 18 carbon atoms, $R^1$ is hydrogen, $R^2$ is ethylene, $R^3$ is lower hydroxyalkyl such as hydroxyethyl, $R^4$ is methylene, and $n$ has a value of 1. These compounds all contain a carboxylic acid group and at least one basic secondary or tertiary amino group, to which are attributable ampholteric properties including stability to acids and alkalies. It will of course be understood that the carboxylic acid group may be in the form of its alkali-metal, alkaline earth metal, ammonium or amine salt, with which it is to be regarded as equivalent. These compounds may in general be prepared by reacting about equimolar proportions of a suitable polyamine, containing at least one active N-hydrogen atom at each end, with a higher fatty acid, preferably at elevated temperatures of about 120° to 200° C. and reduced pressures while removing water of condensation.

As polyamines suitable for the production of the ampholytic compounds employed herein, there may be mentioned ethylenediamine, diethylenetriamine, triethylenetetramine, tetraethylenepentamine, pentaethylenehexamine, propylenediamine, dipropylenetriamine, tripropylenetetramine, hexamethylenediamine, or their suitable N-substituted derivatives such as symmetrical dimethylethylenediamine, aminoethylethanolamine, and similar derivatives containing substituents having the values given for $R^1$ and $R^3$ above. Mixtures of these polyamines may be employed, including for example the crude amine mixture resulting from the reaction of ammonia with ethylene dichloride or propylene dichloride.

As the higher fatty acid to be employed for acylating the polyamine there may be mentioned stearic, oleic, ricinoleic, linolenic, palmitic, valeric, caproic, lauric, myristic, abietic, montanic, or naphthenic acids or the like, their salts or esters, for example, their chlorides, bromides, or ethyl, methyl, or isopropyl esters or the like, the fats or oils from which they are obtained, or mixtures thereof.

The resulting N-acylated polyamine may then be treated to insert a carboxylic acid group at the opposite terminal, as for example by reaction with a lower aliphatic halogen carboxylic acid such as monochloroacetic acid, β-chloropropionic acid, γ-chlorobutyric acid, or the like, or their salts, esters or nitriles, or by reaction with formaldehyde, acetaldehyde, or other aldehyde and hydrogen cyanide, sodium cyanide, or the like. Where the final product contains a carboxylic acid ester or nitrile group, subsequent saponification will yield a free carboxylic acid group or its salt. This carboxylation reaction is preferably preceded by treatment of the product containing the N-acylated polyamine with water at elevated temperatures and if desired in the presence of caustic or the like to hydrolyze any imidazoline formed during the reaction between the polyamine and the fatty acid. The carboxylation reaction is carried out also at elevated temperatures, if desired in the presence of caustic or the like.

If desired, the ampholytic compounds of the instant invention may be prepared by first reacting the polyamine with the carboxylating agent followed by subsequent acylation with the higher fatty acid. Likewise, at any intermediate stage during either alternative reaction for producing the instant ampholytic compounds, or subsequently, hydroxyalkyl, hydroxyalkoxyalkyl, or hydroxypolyalkoxyalkyl groups may be introduced by treatment of the intermediate or end product with ethylene oxide or propylene oxide or the like for reaction with active N-hydrogen atoms.

The non-ionic surface active compounds employed in the compositions of the instant invention are also well known in the art, are water-soluble (or readily water-dispersible), and may in general be produced by reaction of one mole of an alkyl phenol or higher aliphatic alcohol with at least 4 moles of ethylene oxide. The oxyethylation reaction is well known in the art and is fully described in U. S. Patent Nos. 1,970,578, 2,213,477, 2,593,112 and many other patents. The reaction is preferably carried out at elevated temperatures and pressures and may be catalyzed by quaternary hydroxides, amines, acids and/or coordinating compounds, although strong alkaline catalysts such as KOH or NaOH and the like are preferred. Alkyl phenol compounds employed for reaction with ethylene oxide are preferred which contain a total of from about 4 to 20 alkyl carbon atoms. As examples of such compounds may be mentioned normal and isomeric butyl, amyl, dibutyl and diamyl phenols and cresols, tripropyl phenols and cresols, heptyl, octyl, nonyl, decyl, undecyl, dodecyl, tetradecyl, cetyl, oleyl, octadecyl and the like, phenols and cresols, in addition to dihexyl- and trihexylphenol prepared from hexene-1 and phenol, diisoheptyl-phenol, dioctyl-phenol, dinonyl-phenol, dioctyl - p - cresol, di - octyl - o - cresol, didecyl-phenol, didecyl-p-cresol, didodecyl-phenol, and the like. Of particular value are the polyoxyalkylene derivatives of secondary and tertiary alkyl substituted phenols and cresols obtained by condensing olefins of the type obtained in petroleum refining with phenols or cresols. In the case of products obtained by condensing phenol or cresol with olefins of from 3 to 5 carbon atoms such as propylene, butylene and amylene, it is desirable to employ the dialkylated phenols or cresols, while in the case of compounds obtained by condensing a phenol or cresol with an olefin containing 8 or more carbon atoms, the mono-substituted derivatives are preferred. Particularly desirable derivatives can be obtained from the phenols and cresols containing a substituent derived from olefins containing from 8 to 18 carbon atoms, such as diisobutylene and other alkylenes as nonylene, decylene, undecylene, dodecylene, pentadecylene, octadecylene and mixtures thereof, and may advantageously be the dimers and trimers obtained by polymerization of such low molecular weight olefins as propylene, butylene, isobutylene, amylene or mixtures thereof. As aliphatic alcohols suitable for reaction with ethylene oxide there may be mentioned octyl, dodecyl, myristyl, cetyl, octadecyl, oleyl, montanyl, abietinyl, in addition to branched chain alcohols as for example those produced by the Oxo reaction of carbon monoxide and hydrogen with multibranched olefins of 7 to 17 carbon atoms such as tripropylene, tetrapropylene, pentapropylene, diisobutylene, triisobutylene, tetraisobutylene, or the like, followed by catalytic reduction of the resulting aldehyde to the corresponding primary alcohol. Among such Oxo alcohols oxotridecyl alcohol derived from tetrapropylene or triisobutylene, is preferred. It will be understood that propylene oxide may be regarded as the equivalent of ethylene oxide for the oxyalkylation of alkyl phenols and aliphatic alcohols in the production of the non-ionic surface active agents operative herein. Preferred non-ionic surface active agents for use in the instant invention are the condensation products of 8 to 25 moles of ethylene oxide with 1 mole of an alkyl phenol containing 8 to 12 alkyl carbon atoms or with 1 mole of a higher aliphatic alcohol containing a saturated or unsaturated hydrocarbon radical of 12 to 18 carbon atoms.

The compositions of the instant invention may be provided in a pure 100% active form or in the form of a paste, concentrate, or solution in aqueous and/or organic media. In many cases, it may be desirable to employ a small amount of an organic solvent such as ethyl or isopropyl alcohol, ethylene glycol, Carbitol, Cellosolve or the like to assist in forming concentrated aqueous solutions of the instant compositions. The compositions are employed for the wet treatment of various types of materials by dissolving them in a sufficient amount of water depending upon the particular treatment involved. Also, depending upon the treatment, the treating solution may be rendered acid, neutral, or alkaline without having any detrimental effect upon the instant compositions.

Excellent results are obtained when the compositions of the instant invention are employed for softening, lubricating, improving the hand, body and draping properties, and providing resistance to electrostatic charges of fibrous materials. In such applications, it is generally desirable to omit a subsequent washing or rinsing step. About 4 to 75% of the non-ionic surface active agent by weight of the ampholytic compound is usually sufficient to attain the desired results. The concentration of the composition in the treating solution will of course depend upon the manner of application and the liquors: fiber ratio, but in any case the treatment should result in the impregnation of the fibrous material with about 0.05 to 5%, and preferably about 0.5 to 3% of the instant compositions, based on the weight of the fibers. Since the compositions of this invention are amphoteric in nature, they may be applied in acid, neutral or alkaline media as desired for the production of optimum results. Where a long liquor: fiber ratio is employed, it has been found highly advantageous in many cases to carry out the major part of the treatment at a neutral or alkaline pH and to subsequently acidify the bath with formic or acetic acid or the like to an acid pH of about 4 to 5 whereby a more complete exhaustion of the instant compositions onto the fibrous material is attained. In addition to pressure machines, jigs, overhead reel machines and other long liquor treating equipment, quetch and padding machines and other short liquor treatment equipment may also be employed for the treatment of fibrous materials with the compositions of the instant invention. In such short liquor treating equipment, a neutral or slightly alkaline bath is usually desirable because substantivity of the composition to the fibrous material is usually unnecessary and acidification is then omitted. In such equipment, a liquor pickup of about 60 to 100% by weight of the fiber is usual, and hence more concentrated solutions are necessary.

The above described softening treatments may be applied to all types of fibrous materials, including animal, vegetable and synthetic fibers such as wool, silk, regenerated cellulose, cellulose acetate, Orlon, Dynel, Acrilan, Dacron, and the like which may or may not have been previously dyed or printed. The instant compositions do not adversely affect the light fastness or shades of dyestuffs, are highly resistant to yellowing and decomposition during storage or high temperature drying or curing, and the like. They may be applied alone or in combination with other types of treating agents such as resins, starches, waxes, sulfonated oils, dye fixing agents, brightening agents, fillers, oils, and the like. Excellent results are obtained when the instant compositions are applied in combination with thermosetting resins such as the water soluble or dispersible condensation products of formaldehyde with urea, dicyandiamide, melamine, and the like, or with thermoplastic resins such as those derived from acrylic acid, methacrylic acid, methyl methacrylate, vinyl chloride, vinyl acetate, styrene, methyl and ethyl vinyl ethers, and their copolymers with maleic anhydride and the like. Solutions containing both the instant compositions and the said resins are stable for long periods of time without separation or gelling. The tendency of the fibrous material to be stiff, harsh and/or brittle by reason of the resin treatments alone is thereby eliminated, the resulting treated fibrous materials being greatly improved with respect to lubricity, suppleness, draping and wearing characteristics, resistance to abrasion, washing and dry cleaning, and the like. Such improved resistance is probably due to chemical reaction of the instant compositions with the resin. In preparing such resin treating compositions, the instant compositions are employed in the above mentioned proportions based upon the weight of the fiber dissolved in the resin solutions containing from about 3 to 20% of the resin based upon the weight of the fiber, the lower proportions being usually preferred for shrink proofing and higher proportions for crease proofing.

Excellent results have also been obtained when about 10 to 60% of a compatible, dispersible, high melting mineral wax such as eicosane or the like, based on the weight of the ampholytic compound, is added to the compositions of the instant invention. A substantial reduction is thereby attained in the cutting of fibers by the needle and heating of the needle due to friction in subsequent use of the treated fibrous materials in the high speed sewing machines now in use.

Excellent results are also obtained when the compositions of this invention are employed in the wet treatment of wool and mixed wool fibrous material as a fulling agent, milling assistant and/or scouring agent. In such applications, the instant compositions are usually removed from the fibrous material after the fulling, milling, and/or scouring treatment as for example by washing and/or rinsing. When used in this manner, about 20 to 300 parts of the non-ionic surface active agent by weight of the ampholytic compound are employed, the higher proportions being especially preferred where the fibrous material contains larger quantities of extractables such as grease, oil fats, and the like. In view of the amphoteric properties of the instant compositions, they may be employed in neutral, acid or alkaline medium. Not only do the instant compositions give excellent felting of the wool with good detergency in subsequent neutral or alkaline scouring operations, but they enable the attainment of an excellent hand, shrink, body and general appearance. With the use of the instant compositions, a wide range of finishing effects is possible above and beyond conventional fulling techniques. By increasing the amounts of the instant compositions, within the above mentioned range of .05 to 5% and preferably 0.5 to 3% by weight of the fiber, felting as well as body and fabric "cover" is substantially increased. Correspondingly, less felting and "cover" is attained with lower quantities. In general, the instant compositions can be used over the entire pH range normally considered for wool-containing fibrous materials and have wide latitude in producing conventional and normal fulling effects ranging from acid milling of heavy felts to light scouring of open weave piece goods in the washer. When used in the above manner, the instant compositions have excellent lubricating qualities, good rinsability in neutral and alkaline systems, are not salted out in aqueous solutions containing large amounts of electrolytes, have good resistance and stability to hard water, acids and alkalies, do not hydrolyze in aqueous systems and can be employed in solutions of any pH ranging from 1 to 14.

Although the fulling and/or scouring process may be carried out at any pH, the instant compositions are highly advantageous for use in the simultaneous fulling and neutralizing of carbonized woolens in the fulling mill whereby the usual neutralizing operation following carbonizing is eliminated. In the usual processing, the fulling solution must contain enough soda ash or other alkaline substance to neutralize the acid, usually an organic or mineral acid such as sulfuric (in amounts of up to 5% on the weight of the fiber) plus the quantity of soda ash normally required for soap fulling purposes. The instant compositions may be used as a fulling agent by mere addition thereof to the carbonized acid-containing fibrous material and the material subjected to treatment in the fulling mill in the usual manner. Alternatively, the instant compositions may be incorporated together with the alkaline neutralizing substance and the resulting solution applied to the cloth by means of the "soaping machine" or by application to the dry fibrous material in the fulling mill. In many instances, best results are obtained, with minimum damage to the wool fibrous material, by application of the fulling solution at a pH of from about 2 to 6, and preferably about 4 to 5, the isoelectric point of wool fibers. Adjustment of the pH to these values may in some instances be necessary by addition of an acid such as citric, aconitic or gluconic or other organic acid which simultaneously acts to prevent corrosion of fulling equipment which may be caused by the acidity of the solution. For the same reason, a sequestering agent such as ethylene diamine tetraacetic acid or its salts may be employed in the usual amounts in the instant compositions to minimize staining of the fibers and the like caused by iron and other metal salts formed in the bath by reason of corrosion of the treating equipment by the acid fulling solutions. About ½ to 4 or 5 hours' treatment is usually sufficient for fulling wool fibrous material and from 1 to 30 minutes for scouring purposes. In general, short liquor:fiber ratios of from about 1 to 1½:1 are employed in fulling, and long liquor:fiber ratios of about 5 to 20:1 are employed in scouring. The instant fulling compositions enable the attainment of excellent fiber lubricating and fiber protective effects under acid conditions. Such fibrous materials in the presence of sulfuric acid do not discolor or turn yellow in the presence of the instant compositions, which is a danger when using sulfonated oils and many other assistants. In addition, the fulling time is accomplished in shorter periods of time than with conventional assistants in alkaline fulling. The use of the instant compositions for fulling wool fibrous materials offer several advantages over the use of soap, which in hard water forms an insoluble soap difficult to remove from the material after fulling and which in acidic solution forms fatty acids, which limits its use on acid carbonized wool and causes difficulties in subsequent acid processing such as dyeing with acid dyestuffs if the soap is not completely removed from the wool.

By use of the instant compositions for the softening and fulling purposes above described, improved results are obtained with respect to solubility, dispersibility, and stability in storage of the treating solutions; softening, better fiber color, tensile strength and fullness of the treated fibrous material, and the like as compared with similar compositions not containing the non-ionic surface active agents required herein. Ordinary temperatures ranging from room temperature to 90 to 120° F. are employed.

The following examples, in which parts are by weight unless otherwise indicated, are illustrative of the instant invention and are not to be regarded as limitative.

Example 1

Into a 5-liter, 3-necked flask equipped with distillation column, stirrer and thermometer was placed 1704 g. (6 moles) of stearic acid and 642.7 g. (6.18 moles) of aminoethylethanolamine. The flask was evacuated to 200 mm. Hg absolute pressure and the charged materials heated to 150° C. while distilling off water and stirring vigorously. The mixture was stirred at about 150° C. for 4½ hours. A total of 116.5 g. of distillate containing 0.076 mole amino calculated as aminoethylethanolamine was collected in the receiver and Dry-Ice trap. The product containing the desired N-(2-stearamidoethyl)-ethanolamine was titrated to determine the extent of conversion of amino to amide. A 94.5% conversion (compared with the theoretical value) was found. Ultra-voilet absorption showed that there was 20% of 1-hydroxyethyl-2-heptadecyl imidazoline. The reaction product was then allowed to cool to 120° C. and the vacuum discharged to atmospheric pressure. 27 g. (1.5 moles) of water was added to the reaction mixture and the product stirred 1 hour at 115 to 120° C. under reflux to completely hydrolyze the imidazoline. Final product weighed 2,254 g. and had a melting point of 94.5 to 96° C.

Into a 3-liter, 4-necked round bottom flask equipped with stirrer, thermometer, condenser and plug was charged 104.5 g. (1.1 mole) of chloroacetic acid and 1131.5 g. of distilled water. To the resulting solution was added 109.2 g. (1.1 mole) of 40% sodium hydroxide solution with stirring to obtain a pH of 8 to wet Hydrion paper. The solution was heated to 60° C. with stirring and a total of 376.2 g. (1.0 mole, approximately) of the above reaction product containing the N-(2-stearamidoethyl)ethanolamine was added (molten) over a period of ¾ hour while maintaining the temperature of the reaction mixture at 60–65° C. The mixture was stirred an additional 2 hours at 60° C. causing the pH of the mixture to drop to 5.8.

To 1,082 g. of the above product was added 22.7 cc. (32.4 g. 0.295 mole) 13 N NaOH over a period of 6 hours while stirring at 80° C. The pH of the product was 7.8. To 709 g. of this product was added 213 g. distilled water followed by 6.0 ml. (7.08 g.) concentrated hydrochloric acid while stirring at 50–60° C. A solution of 2 g. of the resulting neutralized product in 20 cc. of distilled water at a pH of 7.75. The product, containing the desired compound of the formula

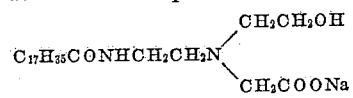

was almost white and of a creamy consistency. No separation was discernible after testing in an oven at 53° C. overnight.

Example 2

Samples of cotton print cloth (80 x 80), cotton drill, nylon, Orlon, wool, silk and viscose, cuprammonium and acetate rayon are padded at 120–140° F. with an aqueous solution containing per liter 5 g. of a composition composed of 95% of the product of Example 1 and 5% of the condensation product of 1 mole of oleyl alcohol with about 20 moles of ethylene oxide with pressure on the squeeze rolls adjusted to deposit 0.5% of said composition owf. (on the weight of the fiber). The treated samples are then dried and conditioned overnight under atmospheric conditions. They have an improved soft, full hand with no perceptible discoloration or odor development.

Example 3

10 g. samples of cotton print cloth, cotton drill, nylon, Orlon, wool, silk and viscose, cuprammonium and acetate rayon are treated for ½ hour at 120° F. in 200 cc. of an aqueous solution containing 0.05 g. of the composition described in Example 2. Towards the end of the treatment, 3% owf. of acetic acid (56% conc.) is added. The treated samples are then extracted without rinsing, dried and conditioned overnight under atmospheric conditions. The acid addition improves the substantivity of the composition for the fabric resulting in better exhaustion and greater softening with no perceptible discoloration or odor development.

Example 4

Samples of cotton and viscose and cuprammonium rayon are padded at 120–140° F. with an aqueous dispersion containing per liter 150 g. of dimethylol urea and 5 g. of the composition described in Example 2, with pressure on the squeeze rolls adjusted to obtain a liquor pickup of 100% owf. The treated samples are dried and cured for 5 minutes at 300° F., rinsed, dried and conditioned overnight under atmospheric conditions. The addition of the said composition results in a creaseproof finish having improved softness and abrasion resistance resistant to washing, dry cleaning and discoloration. Similarly improved results are obtained with aqueous dispersions containing per liter from about 30 to 200 g. of dimethylol urea, the lower amounts being employed for a shrinkproof finish and higher amounts for a creaseproof finish.

Example 5

The procedure of Example 4 is repeated, but using methylol melamine instead of dimethylol urea. Similarly improved results are obtained.

Example 6

Wool slubbing is impregnated with 1.0% owf. of the product of Example 1 and 0.5% owf. of the condensation product of 1 mole of nonylphenol with about 9 moles of ethylene oxide, subjected to a fulling operation for about 30 minutes in a laboratory fulling mill known as an Abbott Machine, and then rinsed and dried. The product is a clean, tight, compact felted disc.

Example 7

Similar results are obtained when the procedure of Example 6 is repeated using the compound having the formula

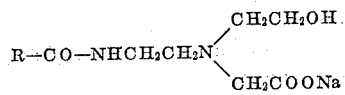

wherein R is lauryl, instead of the product of Example 1.

Example 8

Similar results are obtained when the procedure of Example 7 is repeated, employing a product in which R is derived from coconut oil hydrocarbons.

Example 9

Example 8 is repeated, but including 2.5% sulfuric acid owf. during the fulling operation. The product is a clean, tight compact felted disc which is not discolored or yellow. When the same procedure is carried out using a highly sulfated oleic acid oil instead of the ampholytic compound employed in Example 8, the product is yellowed and discolored.

Example 10

Carbonized wool piece goods containing about 5% sulfuric acid owf. are impregnated with the composition employed in Example 8, subjected to a hand fulling test by rubbing the pieces between the palms of the operator's hands, rinsed and dried. The fabrics so treated felt readily into a clean, tight compact product.

Example 11

The procedure of Example 10 is repeated, but applying with the said composition sufficient soda ash to neutralize the sulfuric acid in the piece goods. A similar product is obtained.

Example 12

The procedure of Example 10 is applied to wool piece goods (in the greige) containing grease and wool oil. Similar results are obtained.

Example 13

The procedure of Example 10 is applied to carbonized (in the greige) wool piece goods containing about 5% sulfuric acid owf., and sufficient soda ash is applied with said composition not only to neutralize the fabric but to render it alkaline. Similar results are obtained.

Example 14

Cotton thread is impregnated with about .75% owf. of a mixture containing about 35% eicosane and 65% of the composition of Example 1, and dried. A soft, pliable thread is obtained which is highly resistant to abrasion and breakage in high-speed sewing machines.

Example 15

The procedure of Example 14 is applied to cotton flannel piece goods, and the goods then napped with a wire brush. By use of this procedure, less fiber is lost during the napping and an improved finish is obtained in shorter napping time.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

We claim:

1. A composition for use in the wet treatment of materials comprising an ampholytic compound having the formula

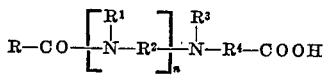

wherein R is an alkyl radical of at least 8 carbon atoms, $R^1$ and $R^3$ are selected from the group consisting of hydrogen and lower alkyl, hydroxyalkyl, hydroxyalkoxyalkyl, and hydroxypolyalkoxyalkyl, $R^2$ is an alkylene radical of from 2 to 6 carbon atoms, $R^4$ is an alkylene radical of from 1 to 4 carbon atoms, and $n$ has a value of at least 1, and about 4 to 300% based on the weight of said ampholytic compound of a non-ionic surface active agent having the formula $$R^5-(CH_2CH_2O)_{n_1}-H$$

wherein $R^5$ is selected from the group consisting of alkyl phenoxy and higher alkoxy, and $n_1$ has a value of at least 4.

2. A composition as defined in claim 1 wherein said non-ionic surface active agent is the condensation product of one mole of nonylphenol with from 8 to 25 moles of ethylene oxide.

3. A composition as defined in claim 1 wherein said non-ionic surface active agent is the condensation product of one mole of oleyl alcohol with from 8 to 25 moles of ethylene oxide.

4. A composition as defined in claim 1 wherein said ampholytic compound has the formula

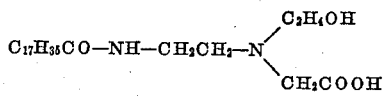

5. A softening composition for fibrous material as defined in claim 1 containing about 4 to 75% of said non-ionic surface active agent by weight of said ampholytic compound.

6. A fulling composition for wool-containing fibrous material as defined in claim 1 containing about 20 to 300% of said non-ionic surface active agent by weight of said ampholytic compound.

7. A mixture for the treatment of fibrous materials comprising a composition as defined in claim 1 and about 10 to 60% by weight thereof of eicosane.

8. A composition as defined in claim 4 wherein said non-ionic surface active agent is the condensation product of one mole of nonylphenol with from 8 to 25 moles of ethylene oxide.

9. A combination as defined in claim 4 wherein said non-ionic surface active agent is the condensation product of one mole of oleyl alcohol with from 8 to 25 moles of ethylene oxide.

10. An aqueous bath for the treatment of fibrous materials containing, by weight, about 3 to 20% of dimethylol urea and about 0.05 to 5% of a composition as defined in claim 5.

References Cited in the file of this patent

UNITED STATES PATENTS

| | | |
|---|---|---|
| 1,970,578 | Schoeller | Aug. 21, 1934 |
| 2,047,066 | Glietenberg | July 7, 1936 |
| 2,047,069 | Hentrich | July 7, 1936 |
| 2,213,477 | Steindorff | Sept. 3, 1940 |